United States Patent
Pham et al.

(10) Patent No.: US 6,473,900 B1
(45) Date of Patent: Oct. 29, 2002

(54) DEVICE FOR BROADCASTING DIGITAL INFORMATION VIA SATELLITE FROM A PLURALITY OF EARTH STATIONS

(75) Inventors: Huu Nghia Pham, Saint-Cyr L'école (FR); Carlo Elia, Pays-Bas (FR); Maria Gouta, Rome (IT)

(73) Assignees: Organisation Europeenne de Telecommunications par Satellite Eutelsat, Paris (FR); Agence Spatiale Europeenne, Paris (FR)

( * ) Notice: Subject to any disclaimer, the term of this patent is extended or adjusted under 35 U.S.C. 154(b) by 0 days.

(21) Appl. No.: 08/932,533

(22) Filed: Sep. 17, 1997

(30) Foreign Application Priority Data

Sep. 20, 1996 (FR) .............................. 96 11484

(51) Int. Cl.[7] .............................. H04N 7/20
(52) U.S. Cl. .............................. 725/63; 725/67; 725/68; 725/70; 725/72; 370/316; 370/320; 370/321
(58) Field of Search .............................. 725/63, 67, 68, 725/70, 72; 455/3.01, 3.02, 3.03, 3.04, 3.06, 7, 11.1, 12.1, 91, 98; 370/315, 316, 319, 321, 322, 323, 324

(56) References Cited

U.S. PATENT DOCUMENTS

| | | | |
|---|---|---|---|
| 4,425,639 A | 1/1984 | Acampora et al. | |
| 4,574,379 A | 3/1986 | Eng et al. | |
| 5,481,542 A | * 1/1996 | Logston et al. | |
| 5,677,905 A | * 10/1997 | Bigham et al. | |
| 5,712,850 A | * 1/1998 | Elia et al. | 370/326 |
| 5,757,784 A | * 5/1998 | Liebowitz et al. | 370/321 |
| 5,812,545 A | * 9/1998 | Liebowitz et al. | 370/337 |
| 5,838,668 A | * 11/1998 | Okada et al. | 370/312 |

FOREIGN PATENT DOCUMENTS

EP  0 695 051  1/1996

OTHER PUBLICATIONS

IEEE Journal on Selected Areas In Communications, vol. 10, No. 6, Apr. 01,1992, pp. 1054–1065, XP000296621. Shuzo Kato, "Novel Satellite Digital Video TDMA System for Business Video Communcications."

* cited by examiner

Primary Examiner—Andrew Faile
Assistant Examiner—Kieu-Oanh Bui
(74) Attorney, Agent, or Firm—Browdy and Neimark, PLLC

(57) ABSTRACT

In the device:
- at least one set of links sends packet formated digital information to the satellite, on at least two different frequencies;
- at least one satellite-borne module receives, multiplexes and re-formates the information on only one downlink;
- at least one of the links works in a Time Division Multiple Access (TDMA) mode.

28 Claims, 5 Drawing Sheets

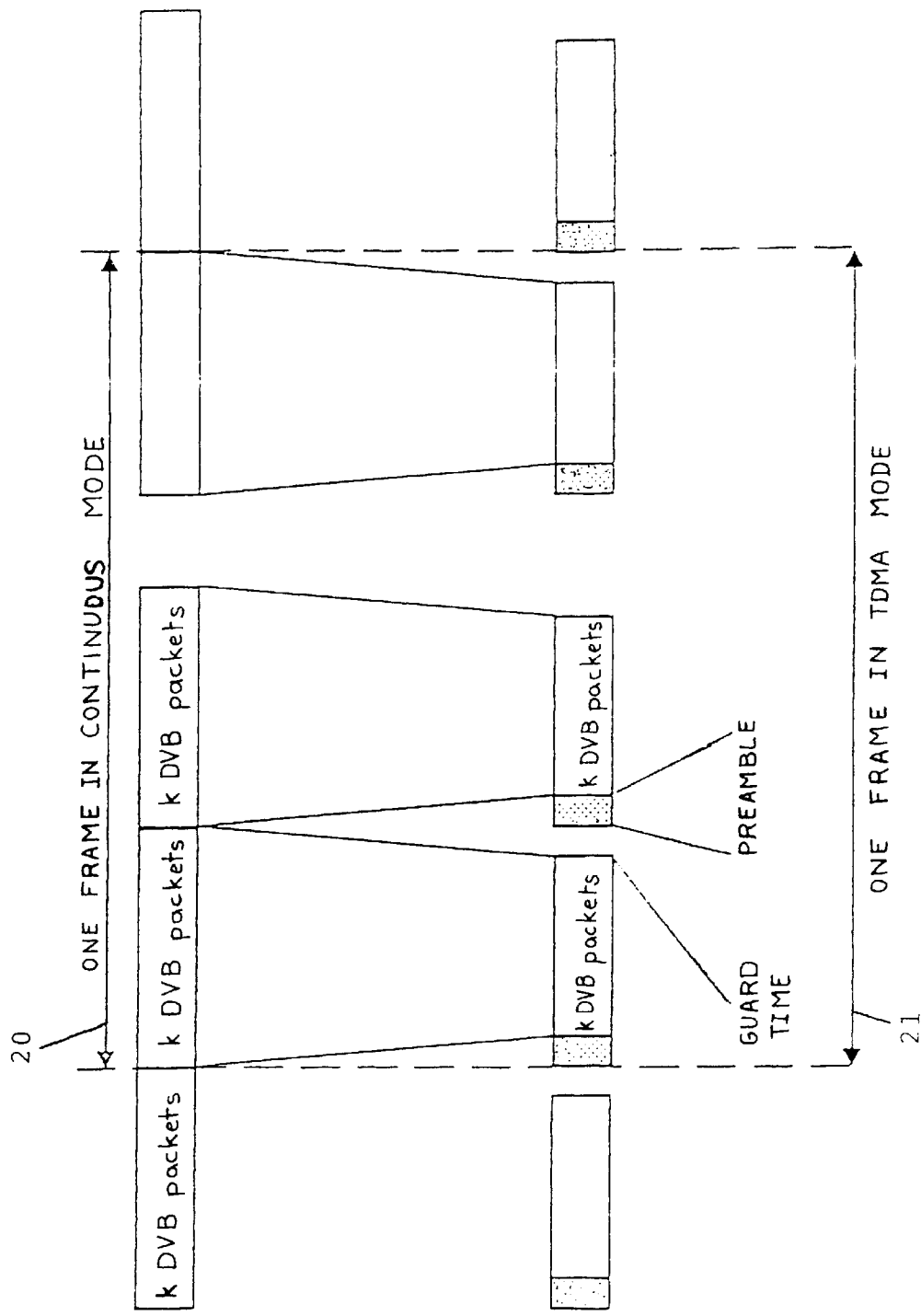
Figure 3-a

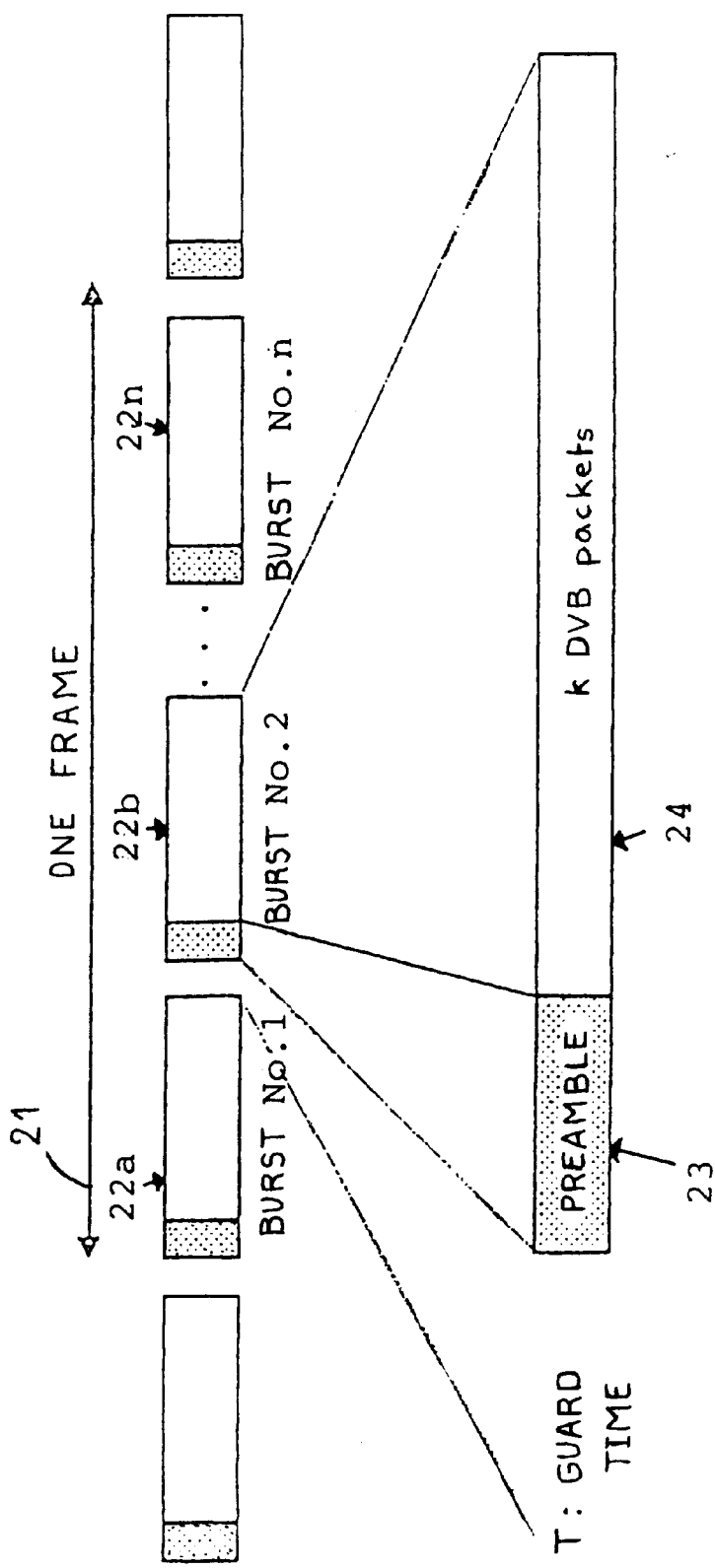
Figure 3-b

DEVICE FOR BROADCASTING DIGITAL INFORMATION VIA SATELLITE FROM A PLURALITY OF EARTH STATIONS

FIELD OF THE INVENTION

The present invention relates to digital transmission via satellite to receivers wich are designed for receiving a signal according to the ETS 300 421 standard (a digital television broadcasting standard via satellite in the Ku bands, called DVB-S and developed by the DVB, Digital Video Broadcasting group).

BACKGROUND OF THE INVENTION

This invention is particularly useful when it is necessary to dispatch digital flows of small flow rates (about 6 Mbits/sec, or less) from a plurality of distant sources belonging to independent entities, towards a multiplexing point in order to form therein the final broadcasting multiplex according to the ISO/IEC 13818-1 standard (system part of the MPEG2 standard developed by the MPEG, Moving Picture Expert Group), while avoiding an architecture involving a terrestrial and centralized transit point.

This invention relates to an improvement of the construction described in French Patent Application filed under No 96 11431 on Sep. 19, 1996 in the name of the Applicants.

The main improvement to the above mentioned construction which is the subject matter of the present invention, relates to introducing a Time Division Multiple Access (TDMA) working mode. Its usefulness is hereinafter justified.

The compressed digital television services according to the MPEG2 standard necessitate flow rates of 5 Mbits/sec. for a so-called "broadcast" video quality, or about a total of 6 Mbits/sec., if a plurality of high quality audio paths and auxiliary data are added. It is sufficient to use a basic architecture as described in the above mentioned patent application and in which six stations are in the course of continuously broadcasting elementary flows of about 6 Mbits/sec. towards a satellite-borne multiplexer.

However, various multimedia services, under current development and called "emergent", may be satisfied with very smaller flow rates, i.e. 3 Mbits/sec. for distance teaching applications or 2 Mbits/sec. for medical imaging applications, and even some hundreds of kilobits/sec. for a vision-conference according to ISO H.261 and H.264 standards. These services can be transmitted under the shape of freely structured data flows, or yet "private data" (according to terminology of the ISO/IEC 13818-1 standard) in a MPEG2 multiplex. These flows are designed to be processed by a computer and may be received by digital television receivers having a so-called data interface on which a data process equipment can be connected. These flows may also be received in a personnal computer fitted with an extension card that is plugged on the extension bus of the computer.

In a satellite-borne system according to FIGS. 1 and 2 of the above mentioned patent application, in which each broadcasting station is assigned with a different frequency channel and continuously transmits in this channel, the great plurality of flow rates to be offered for multimedia services and the great number of demodulators that are necessary make difficult its construction at the level of the satellite-borne module and, in any case, make not very effective a working of the satellite-borne system because the uncertainty of the preponderance of a range of given flow rates.

The TDMA working mode, given the flow rate flexibility therof, responds in an efficacious and appropriate manner to the needs of multimedia services while maintaining the complexity of the satellite-borne equipment into reasonable proportions. In this working mode, earth stations, while referring to a common time base, will transmit on a same frequency, in a sequential order and without time overlaping, digital bursts at a higher flow rate than the flow rate of their respective sources.

In a transmission through a so-called transparent satellite repeater, the time base of a TDMA system is provided by one or more so-called reference stations which transmit, towards the satellite, leading and trailing frame marking signals. The other stations, by a computing operation or a continual approach technic, deduce their transmitting instants from the receiving instants of the frame marking signals coming from the reference stations.

This principle cannot be applied to a system with demodulation and multiplexing in packets on board a satellite because of the necessary presence of buffer-memories used for realigning the packets coming from a plurality of transmitters. Differently speaking, the instant of arrival on earth of a packet, on the going down path, is not enough precisely representative of the instant of arrival of this packet onto the satellite on the going up path. An other mechanism enabling the earth stations to know the instants of arrival of their packets at the level of satellite reception must be definied.

PURPOSE OF THE INVENTION

The present invention concerns the construction of a TDMA system, in a system with demodulation and multiplexing by packets on board, construction in which:

1. One or more of the links on the going up paths $1a$, $1b$, ... $1n$ of a system according to FIGS. 1 and 2 of the above mentioned patent application, may be configured in TDMA transmission mode, while the other links may remain in a continuous transmission mode (hydrid system).
2. The TDMA or continuous configuration of a link is made without the working of the other links be affected in some manner (principle of separation of the links).
3. The structure in MPEG2 packets of the signal that is transmitted via the satellite is used for the definition of the common time base and TDMA frames (TDMA system without reference stations).
4. Special packets are used for enabling the earth stations to make the acquisition and maintenance of the synchronisation with the time base transmitted by the satellite-borne module according to a particular protocole between them and the receiving part of the satellite-borne module (synchronization by means of a satellite-borne software).
5. Activation or termination of the transmission of a TDMA station is made without coordination with the other stations sharing a same link (principle of autonomy).
6. Adjonction of the TDMA mode is modular and necessitates only a few changes in the equipment of the earth broadcasting stations with respect to a continuous transmission mode (principle of modularity).
7. Adjonction of the TDMA mode has no occurrence on the compatibility with the earth receivers designed for receiving the DVB-S signal.
8. The basic parameters, frame length, guard-time and synchronisationprotocole, enable a simple embodiment of the satellite-borne module, without significative loss in effectiveness (principle of minimal complexity).

SUMMARY OF THE INVENTION

According to the invention, the device for broadcasting digital information via satellite from a plurality of earth stations, comprises:

at least one set of links sending packet formated digital information to the satellite, on at least two different frequencies;

at least, one satellite-borne module which receives, multiplexes and re-formates the information on only one downlink;

at least one of the links which works in a Time Division Multiple Access (TDMA) mode.

According to other features of the invention:

the signal that is transmitted via satellite is a time multiplex signal containing all the useful information, individually transmitted toward via satellite by a plurality of earth stations and rigorously compatible with receivers designed for a reception of signals according to a standard of digital television broadcasting via satellite in the Ku bands, called DVB-S, one or more of the links of the going up path of a transmission system of an earth station is (are) configured in TDMA transmission mode while the other links remain in continous transmission mode, the TDMA or continuous configuration of an uplink is made without a working of the other links be affected thereby, by providing an increase of the transmission flow rate on the going up path of a link with respect to the continuous mode working on this link, and this increase is used for accomodating the preamble and guard-time functions of the transmission in a burst mode;

the structure of MPEG2 packets of the signal transmitted via the satellite is used as follows for a definition of the TDMA frames, these TDMA frames being generated on board the satellite:

in lack of received data, the multiplexer generates jamming packets, the program identification (PID) of which takes a single value corresponding to each uplink;

when an uplink is configured in TDMA mode, the multiplexer makes a numbering, in a cyclic manner, of the order of the generated packets, a 5-bit field for numbering the jamming packets, in the useful part of the MPEG2 packet, is used for this purpose;

when a burst in a going up station, among n stations, comes to the satellite in phase with a portion of TDMA frame, the DVB packets of this burst will be substituted to the jamming packets for this portion of TDMA frame.

the activation or termination of the transmission of a TDMA station is made in an autonomous manner without coordination with the other stations sharing a same link;

a short burst and predetermined packets are used for enabling the earth stations to make a fast, reliable and precise acquisition according to a protocole between them and a receiving part of the satellite-borne module;

basic parameters, frame length, guard-time and synchronisation protocole and the like, are chosen so to enable a simple implementation of the satellite-borne module;

a frame structure transmitted via the satellite comprises a fixed number, equal for example to 48 DVB packets;

a 52/48 ratio is used for the flow rate increase on the uplinks that are re-configured in TDMA mode;

adjonction of the TDMA mode is a modular adjonction, whereby only a few changes are made in the equipment of the earth transmission stations with respect to the continuous transmission mode;

a compatibility of the multiplexed signal on the downlink is made with earth receivers that are designed for receiving signals according to the DVB-S standard with adjonction of the TDMA mode.

Various other features of the invention will moreover be revealed from the following detailled description.

BRIEF DESCRIPTION OF THE DRAWINGS

An embodiment of the invention is shown, as a non limitative example, in the accompanying drawings, wherein

FIG. 3a shows the frame structure, on the one hand, in continuous mode and, in the other hand, in TDMA mode;

FIG. 3b illustrate details of TDMA bursts;

DETAILLED DESCRIPTION OF THE INVENTION

As hereinabove mentioned the present invention relates to an improvement of the construction described in French patent application filed under No 96 11431 on Sep. 19, 1996 in the name of the Applicants.

Figure 1:
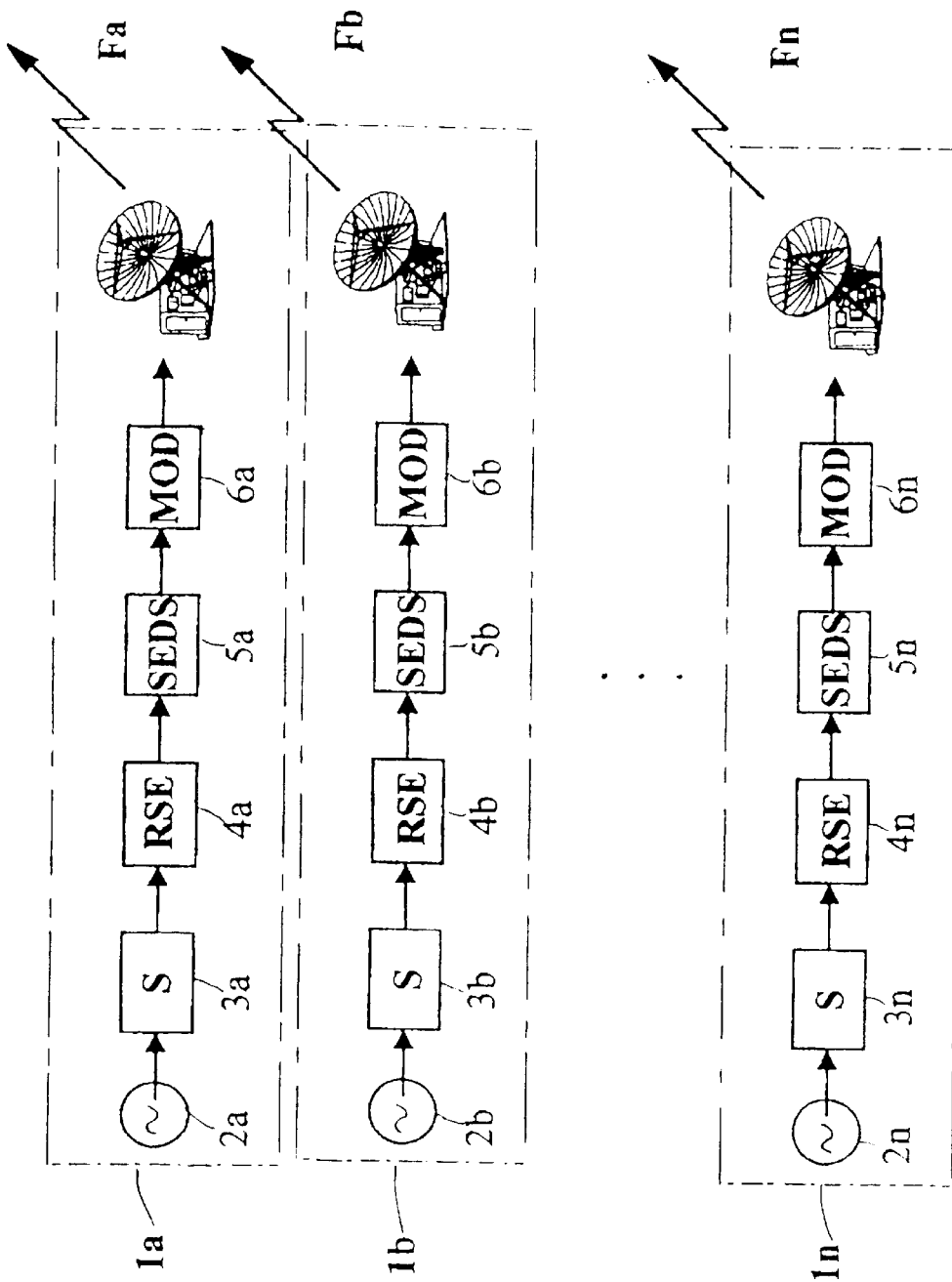
FIG. 1 illustrates a structure of earth transmission stations.
Figure 2:
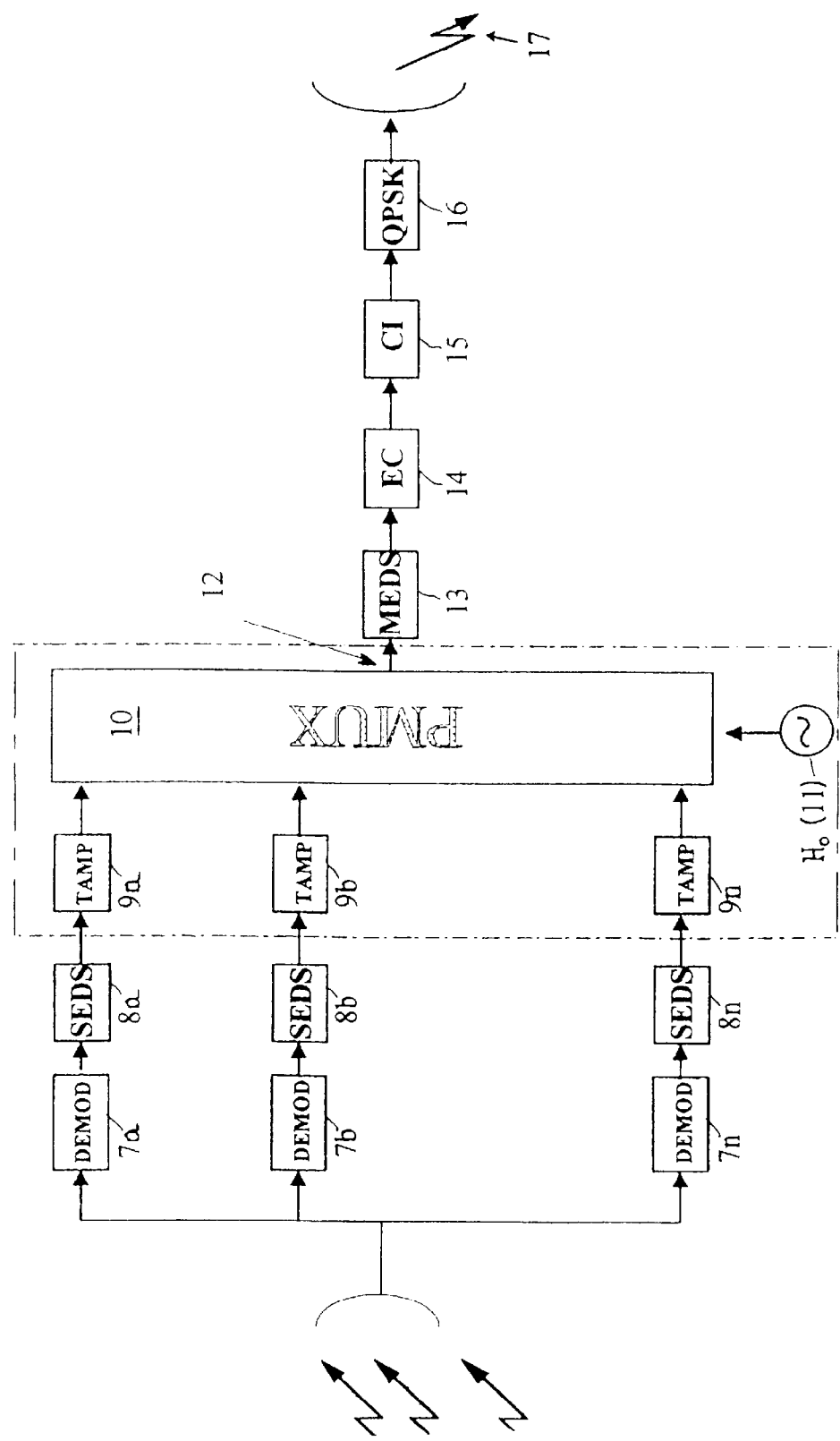
FIG. 2 shows a structure on board the satellite.

Accompanying FIGS. 1 and 2 correspond to FIGS. 1 and 2 of the above mentioned French patent application.

In FIG. 1, each earth broadcasting station $1a$, $1b$, . . . , $1n$ comprises a source S, shown at $3a$, $3b$, . . . , $3n$, that generates packets of 188 bytes starting with a synchronisation byte, the value of which is a fixed value equal to 0×47 (47 in hexadecimal) and by three header bytes, followed with 184 bytes of useful load.

The various sources S are driven by individual clocks shown at $2a$, $2b$, . . . , $2n$, which are not necessarily synchronous clocks, and the common denominator is the clock extracted from the digital signal received on the going up paths (point 17, in FIG. 2)

The packets outputting from the sources S are treated by Reed-Solomon encoding RSE blocks $4a$, $4b$, . . . , $4n$, these blocks being rigorously in accordance with the DVB standard and being, in the embodiment as exemplified, connected to SEDS blocks that form simplified energy dispersion scramblers, shown at $5a$, $5b$, . . . , $5n$. These blocks are in fact not necessarily required.

The binary flow resulting from the scrambling blocks SEDS is modulated, for example in quadriphase (QPSK) or in any other appropriate binary modulation according to the specific needs, either in pass band conservation or in energy conservation, by modulators MOD shown at $6a$, $6b$, . . . , $6n$. The transmission central frequencies Fa, Fb, . . . , Fn of the stations are assigned in a static manner in function of the bank of satellite-borne demodulators (FIG. 2).

In FIG. 2, outputs of demodulators DEMOD, shown at $7a$, $7b$, . . . , $7n$ adapted to the modulators MOD of FIG. 1, are respectively connected to SEDD blocks that form simplified energy dispersion de-scramblers shown at $8a$, $8b$, . . . , $8n$.

The SEDD blocks $8a$, $8b$, . . . , $8n$ are connected to input/output buffers (TAMP) shown at $9a$, $9b$, . . . , $9n$ of a size that is equal at least to two DVB packets, the functions of which are:

to cancel the differences between the writing clocks which are recovered by the demodulators 7a, 7b, ..., 7n from the going up signals, on the one hand, and, on the other hand, the reading clocks derivated from the satellite-borne clock Ho, shown at 11 and working into asynchronism with all earth clocks. The clock 11 drives all the satellite-borne assembly which begins by a multiplexer PMUX shown at 10;

to align the packets coming from the output of each of the SEDD blocks which are not necessarily in phase, at a level of the bits, the bytes, and the packet leadings, taking into account the loss of interstation synchronisation.

The multiplexer PMUX 10 makes a cyclic reading of the buffers TAMP and, if these buffers contain a full packet at the time of reading, the multiplexer PMUX 10 will transfer this packet to the great flow rate single output 12; otherwise, the multiplexer 10 will insert a special packet which is called a "dummy packet". In this operation, the multiplexer 10 is driven by the clock Ho.

A modified scrambler MEDS, shown at 13 and which is connected to output of the multiplexer 10, operates on blocks of 204 bytes at the output 12 of the multiplexer.

The modified scrambler MEDS 13 makes an Exclusive OR operation (XOR) between the packets of 204 bytes outputting from the multiplexer and pseudo-random sequences that are also of 204 bytes in length.

The scrambling operation generated by the modified scrambler MEDS produces a flow of packets that is identical to that obtained with the original diagramm of the DVB-S in which the Reed-Solomon encoding is applied to output of the DVB-S scrambler. Consequently, the output of the MEDS 13 may be directly connected to the convolutive interleaving block (EC) of the DVB diagramm, here shown at 14. The inner coding blocks (CI) and the quadriphase modulation block (QPSK), respectively shown at 15 and 16, are rigorously in accordance with the DVB-S specification.

The formating of the information which is thus made at output of the modulation block 16 is compatible with any receiver shown at 17, and designed for receiving a signal in accordance with DVB-S standard.

The following description relates to basic parameters and principles of the TDMA system used in the present invention.

When a link is re-configured from a continuous working mode into a TDMA mode, the broadcasting stations 1a, 1b, ..., 1n that transmit on this link increase the instantaneous flow rate outputting from their modulator by a fixed ratio whatever is the working rate in continuous mode of the link. The choice of a fixed ratio minimizes the number of clock frequencies in the system.

In the construction according to the present invention, this ratio is chosen equal to 52/48 with respect to a working in continuous mode, which means an increase of 8.3%.

The separation of the central frequencies of the earth stations 1a, 1b, ..., 1n of the system has been chosen to be sufficiently wide for taking into account the spectral enlargement resulting from this increase of rate flow.

The above mentioned increase (8.3%) is used for accomodating the guard-times between bursts coming from differents stations, and for accomodating the transmission of synchronisation preamble at the beginning of each burst, in the next frame structure (FIGS. 3a and 3b).

It has thus been shown, at the inner part of FIG. 3a, a frame structure in continuous mode, the lower part of the figure showing a frame structure in TDMA mode.

According to the drawings, a continuous frame 20 on the uplink of FIG. 1 comprises 48 time slots, each of these slots being equal to the going up transmission time of a DVB packet. The TDMA frames 21 on the uplink of FIG. 1 each comprise 52 time slots of 52 DVB packets.

FIG. 3b, which illustrates in detail the TDMA bursts, shows that, according to the invention, the various stations 1a, 1b, ..., 1n of FIG. 1, which are then of TDMA type, transmit a set of bursts, that are respectively referenced 22a, 22b, ..., 22n. The bursts 22a, 22b, ... 22n are bursts No 1, No 2, ..., No n that are separated respectively by a guard-time T. As shown in the bottom part of FIG. 3b, each burst comprises a preamble 23 (as an aid to the frequency and clock synchronisation of the satellite-borne demodulators) followed by an entire number k of DVB packets 24.

The entire number k of DVB packets is common to all the bursts of all the TDMA stations having access to a same frequency. Such a constraint is motivated by the care of simplifying the satellite-borne logical functions for the TDMA mode treatment.

The period of one frame is also equal to the time that is necessary for extracting 48 DVB packets from the buffer (TAMP) 9a, 9b, ..., 9n on board of the satellite (see FIG. 2).

The number n of TDMA stations having access to a link must be an integer divisor of 48. The choice of 48 enables, beside other constraints, a sharing of a link by 2, 3, 4, 6, 8, 12, 16, 24 and 48 stations, which numbers are divisors of 48.

The guard-time T between the bursts is a function of the number n of TDMA stations having access to one link. The greater is this number, the smaller is the guard-time T. The guard-time T is such as n×T=4 DVB packets, for example.

The maximum number n of stations able to share an uplink is limited by the minimum time reserved to the guard-time T and to the transmission of the preamble, by the constraint of size of the bumper in the earth receivers 17 of FIG. 3, and by the tolerances to disturbance created by the marking time of the packets at the time of transmission to earth. In a concrete realisation of the satellite-borne modules, this maximum has been set to be equal to 6.

When one of the stations 1a, 1b, ..., 1n of FIG. 1 must be used in TDMA mode, the burst working mode is activated for the corresponding demodulator 7a, 7b, ..., 7n. This activation is made by a remote control from earth through a remote control link of the satellite platform.

The reading speed of the buffers 9a, 9b, ..., 9n by the packet multiplexer (PMUX) is not changed whatever is the mode, TDMA or continuous. Activation of the TDMA mode on a given link has therefore not any influence on the working of the stations of the other links.

The following part of the present description relates to the use of the structure of the MPEG2 packets for defining the TDMA frames that are generated on board the satellite.

In the present invention, the satellite-borne module of FIG. 2 generates all the synchronisation signals that are necessary for the working in TDMA mode. This is made by a particular use of the structures of MPEG2 packets as hereinafter explained.

Figure 4:
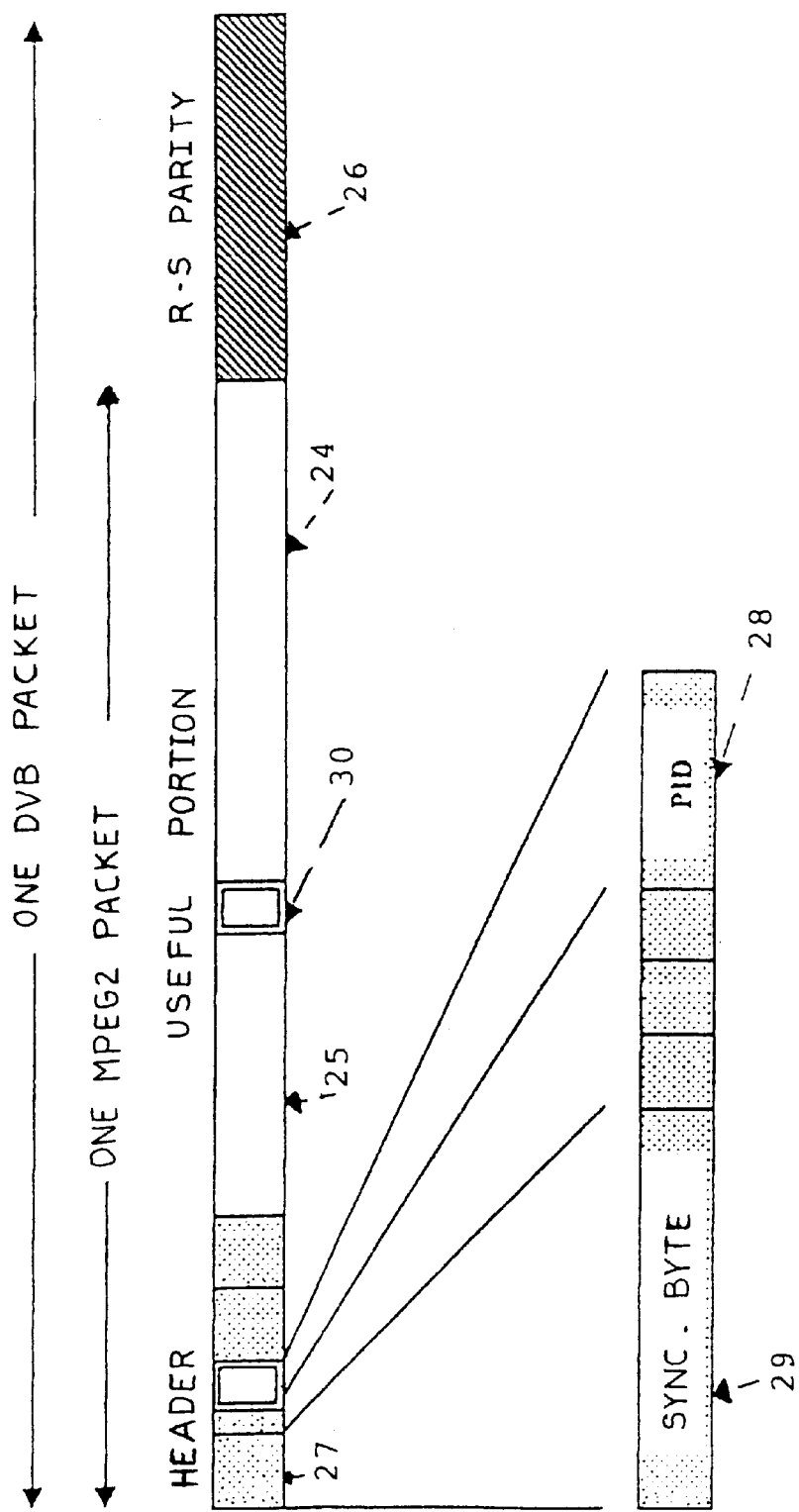
FIG. 4 shows the use of the structure of the DVB/MPEG2 packets.

As shown in FIG. 4, a DVB packet 24 of FIGS. 3a and 3b comprises a MPEG2 packet 25, followed by 16 Reed Solomon parity bytes, referenced 26.

The MPEG2 packets have a structure as defined by the ISO/IEC 13818-1 standard, the elements that are essential for the present invention being diagrammatized in FIG. 4. It will be noted in this figure that each MPEG2 packets comprises a header 27 of 4 bytes containing a plurality of well defined fields followed by a useful part of 184 bytes. In particular, the PID field 28 (Program Identification of 13 bits of the header 27 and which is positioned after the synchronisation byte 29 is provided to make distinction between services carried in a same multiplex, same values of this field being used for indicating the uplink.

The PID field is used in the present invention in two specific manners for making the functions that are necessary for a management of the TDMA mode, which are the telemetry protocole on the one hand, and the synchronisation management on the other hand, these functions are successively described hereinafter.

A telemetry protocole is a mechanism which enables to operators of the earth stations to know, in a quasi real time, the operational parameters, related to their own uplinks, and only to these uplinks, this without calling upon the telemetry functions of the satellite platform, which functions are only under the sole control of the satellite operator.

This protocole is based upon the following rules.

1. The station wanting to know its telemetry data will transmit a packet, a so-called telemetry data request packet, which can be identification by the satellite-borne module with help of a PID that is only for this purpose. This PID may for example be 0FF0 (in hexadecimal); a value that maximizes its Euclidean distance to the PID's that are the mere commonly used for the system functions according to the MPEG2 and DVB standards.

2. The telemetry request packets also contain a field of 5 bits in the useful part of the MPEG2 packet, by only identifying the TDMA station transmitting on the relative uplink.

3. In response to a telemetry data request, the satellite-borne software performs the following functions: (a) it fills the useful part of the telemetry request packet with telemetry data related to the respective uplink, (b) optionally, it substitutes the PID of this packet by the PID the binary representation of which is 00001cccbbbbb and, in this representation, the 5 last bits [bbbbb] will constitute the identificator of the hereinabove described TDMA station and the field of 3 bits [ccc] constitutes the identificator of the uplink (maximum 8). The optional function (b) is not absolutely necessary for identifying, on the downlink, the addressee of the telemetry packet. However, it simplifies this identification which is reduced to a detection of the telemetry packets that is only based on a concordance research of the PID.

A possible construction of the syntax of the telemetry request packets is exemplified hereinunder:

| Syntax | Number of bits | Value | Comment |
| --- | --- | --- | --- |
| Interrogation_Packet O { | | | |
| sync_byte | 8 | $47_{hex}$ | Use according to MPEG2 |
| transport_error_indicator | 1 | 0 | idem |
| paylaoad_unit_start_indicator | 1 | 0 | idem |
| transport_priority | 1 | 1 | idem |
| PID | 13 | $0FP0_{hex}$ | Private use (telemetry request packet) |
| transport_scrambling_control | 2 | 00 | Use according to MPEG2 |
| adaptation_field_control | 2 | 10 | idem |
| contininuity_counter | 4 | 0 | idem |
| Adaptation_field O { | | | |
| adaptation_field_length | 8 | $183_d$ | idem |
| PCR_flag | 1 | 0 | idem |
| OPCR_flag | 1 | 0 | idem |
| transport_private_data_flag | 1 | 1 | idem |
| adaptation_field_extension_flag | 1 | 0 | idem |
| splicing_point_flag | 1 | 0 | idem |
| discontinuity_indicator | 1 | 0 | idem |
| random_access_indicator | 1 | 0 | idem |
| elementary_stream_priority_indicator | 1 | 0 | idem |
| Private data O{ | | | |
| transport_private_data_length | 8 | variable | |
| src_station_id | 8 | $000bbbbb_p$ | Private use (TDMA station identifier) |
| Security Encryption Key | 56 | | Private use |
| (Sync Loss) | 8 | | idem |
| (Input Gain) | 8 | | idem |
| (Input Power) | 8 | | idem |
| (Carrier Status) | 8 | | idem |
| (Timing Status) | 8 | | idem |
| (TDMA packet index) | 8 | | idem |
| (Input Buffer fullness) | 8 | | idem |
| (Guard Time) | 8 | | idem |
| (Real_Time_Data_Valid Flag) | 8 | | idem |
| { | | | |
| private data | Variable | Variable | Private use |
| for (i = 0 ; i < [TBC] ; 1++){ | 8 | $FF_h$ | Until the end of the packet |
| stuffing_byte | | | |
| } | | | |
| } | | | |

-continued

| Syntax | Number of bits | Value | Comment |
|---|---|---|---|
| Reed Solomon parity bits | 128 | XX.. | Values as calculated |

A possible construction of the syntax of a telemetry packet is exemplified hereinunder

| Syntax | Number of bits | Value | Comment |
|---|---|---|---|
| Telemetry Packet 0 { | | | |
| sync_byte | 8 | $47_{hex}$ | According to MPEG2 |
| transport_error_indicator | 1 | 0 | idem |
| paylaoad_unit_start_indicator | 1 | 0 | idem |
| transport_priority | 1 | 1 | idem |
| PID | 13 | $01[cccbbbbb]_b$ | Private use (identifier of the telemetry data addressee) |
| transport_scrambling_control | 2 | 00 | According to MPEG2 |
| adaptation_field_control | 2 | 10 | idem |
| contininuity_counter | 4 | 0 | idem |
| adaptation_field 0 { | | | |
| adaptation_field_length | 8 | $183_d$ | idem |
| PCR_flag | 1 | 0 | idem |
| OPCR_flag | 1 | 0 | idem |
| transport_private_data_flag | 1 | 1 | idem |
| adaptation_field_extension_flag | 1 | 0 | idem |
| splicing_point_flag | 1 | 0 | idem |
| discontinuity_indicator | 1 | 0 | idem |
| random_access_indicator | 1 | 0 | idem |
| elementary_stream_priority_indicator | 1 | 0 | idem |
| private_data | | | |
| transport_private_data_length | 8 | 1 | Private use |
| srs_station_id | 8 | $00yyyyyy_b$ | Private use |
| (Security Encryption Key) | 56 | | Private use |
| Sync Loss | 8 | XXXXXXXX | Private use (telemetry) |
| Input Gain | 8 | XXXXXXXX | Private use (telemetry) |
| Input Power | 8 | XXXXXXXX | Private use (telemetry) |
| Carrier Status | 8 | XXXXXXXX | Private use (telemetry) |
| Timing Status | 8 | XXXXXXXX | Private use (telemetry) |
| TDMA Packet Index | 8 | XXXXXXXX | Private use (telemetry) |
| Input Buffer fullness | 8 | XXXXXXXX | Private use (telemetry) |
| Guard Time | 8 | XXXXXXXX | Private use (telemetry) |
| Real_time_data_valid_flag | 8 | 0 | Private use (telemetry) |
| | | | Private use (telemetry) |
| private_data | Variable c | Variable | Private use |
| for (i = 0 ; i < [TBC] : 1++){ stuffing_byte } } } | 8 | $FF_b$ | Until the end of the packet |
| Reed Solomon parity bits } | 128 | XX... | Value as calculate |

The TDMA frame is, in this invention, generated in the following way by reference to FIG. 4.

In lack of received data., the multiplexer 10 of FIG. 2 generates jamming packets, the PID of which will take a single valve corresponding to each uplink. These PIDs are reserved and are used only for this purpose (uplink indicator).

When an uplink is configured in TDMA mode, the multiplexer 10 will cyclically number, from 1 to 48, the order of the generated jamming packets. A field 30 of 5 bits for numbering the jamming packets, in the useful part of the MPEG2 packet, is used for this purpose (frame indicator).

When a burst of a going up station, among n stations, comes to the satellite in phase with a portion of TDMA frame, the DVB packets of this burst are substituted to the jamming packets for this portion of TDMA frame. This substitution will enable other stations to determine that this frame portion is no more free, by the fact that the PID of the packets of this frame portion is no more an uplink indicator.

The above construction makes possible:
  defining the TDMA frames, one by uplink;
  indicating to the stations that a given uplink is available in TDMA mode;
  indicating, to the TDMA stations desiring having access to a sink, the frame portion that remains free.

The TDMA frame acquisition protocole is explained hereinafter.

The frame acquisition protocols is the procedure that must execute any station which transmits for a first time on a TDMA link for calculating its transmitting instant that is based upon the time base and the TDMA frame that it receives on the downlink.

This procedure must be fast, reliable and precise, and should not necessitate coordination between the stations that share the same link In the present invention, this is made by applying the two following basic techniques:

1. The use, by the stations, of a "short" burst which is voluntarily time shifted;
2. The use, by the stations, or time base information that are precisely coded by the satellite-borne module and sent back to earth in response to the receipt of a short frame.

The working of the device is detailed hereinafter:

The station will determine the portion of TDMA frame with respect to which its burst must come in phase on board the satellite. This determination is based upon its knowledge of the PID of the jamming packets of the relative link. The portion of the considered frame begins by the first jamming packet that its burst must substitute in the TDMA frame. The number of this packet is assumed to be known.

From an approximative initial knowledge of its distance with respect to the satellite, the station will calculate its nominal broadcasting instant and is prepared to transmit a short burst.

A short burst comprises the preamble and a number of DVB packet which is smaller, by at least two packets, than a nominal burst, and the last packet of which is a telemetry information request packet.

The station will broadcast the short burst with a delay, with respect to the calculated nominal time, that is equal to the time for transmitting a going up DVB packet. This construction ensures that the short burst will not go beyond the limit of the portion of the considered frame, in one direction or in an other direction, as much as the initial uncertainty on the distance to the satellite is smaller than ±Δ, Δ being the distance that the light travels through dozing a time equal to that of a DVB packet plus half of the guard-time T.

In response to a received short frame, the satellite-borne module will substitute the corresponding jamming packets by the received packets. In the last packet of the received burst which is a telemetry packet, the satellite-borne module will insert an information field, i.e. a so-called guard-time measurement field which contains a coding of the time elapsed between the arrival instant of the first byte of the first packet of the short burst and the instant that is the nearest corresponding to the middle of a DVB packet.

On receipt of the going down short burst, in comparing the position of this burst in the considered TDMA frame portion and in decoding the time information contained in the last packet, the station can precisely calculate its nominal broadcasting instant. The station can then begin its transmission phase of the traffic packets.

This procedure is a fast procedure 4 since the frame acquisition is made in only one TDMA cycle, which means about 34 milliseconds for an uplink at 2.292 Mbits/sec. or about 11 milliseconds for an uplink at 7.448 Mbits/sec. (smaller and higher flow rates, respectively, in system which will be borne by satellites being in the course to be manufactured.

This procedure is reliable since it tolerates a lack of precision of the initial knowledge of the distance to the satellite of at least ±Δ, i.e. ±80 km (a parameter which is computed for the more critical case, which is that of 6 stations sharing an uplink of the higher flow rate).

This procedure is a precise procedure since it makes possible, after acquisition, a knowledge of the distance of the station to the satellite which is equal to the coding precision of the time information made on the satellite-borne module. This precision may be of a bit order, i.e. the equivalent of 120 meters, or of the byte order, i.e. the equivalent of a kilometer, for the lowest going up flow rate (2.292 Mbit/sec.). For higher going up flow rates, the precision will reach 40 meters with a coding at the bit level and about 300 meters with a coding at the byte level. A great precision will minimize the frequency of the distance diagnostic signals that the station rust transmit to the satellite for maintaining the frame synchronisation according to the hereinafter protocole.

This frame synchronisation maintenance protocols is the procedure that any station must regularly execute in a traffic phase fox readjusting its broadcasting instant in order to avoid an encroachment on the transmitting windows of the other stations. This protocols is necessary because of the slow movement of the satellite and other phenomena of slow clock drift in the system.

In the case of a sharing of one uplink by the maximum of stations, i.e. 6 stations, the total time that is reserved for the preamble and the time-guard is only of $\frac{4}{6}=0.667$ DVB packets. Knowing that the preamble will request one third of the transmission time of a DVB packet, the time-guard is, in this case, of about one thud of the transmission time of a DVB packet.

In case of, an uplink of 7.333 Mbit/sec., this guard-time is calculated to be equal to the equivalent of 24 km. This is not sufficient for preventing an encroachment of one burst on an other, taking into account the movement of the satellite which is generally maintained in a cube a 50×50×50 km.

The present invention solves the hereinabove mentioned problem by using a special packet, a so-called telemetry packet, which is regularly inserted in the traffic flow by the TDMA station. In response to this packet, the satellite-borne module will provide the encoded time information in the same manner than in the case of a short burst. After a decoding of this information, the TDMA station will readjust its broadcasting instant, if necessary, for taking into account possible detected drifts.

Taking info account the length of the guard-time and the amount of drift phenomena, the telemetry packets are transmitted only at a very small frequency (for example, one packet per hour).

We claim:

1. A device for broadcasting digital information via satellite from a plurality of earth stations, comprising:
    at least one set of links sending packet formatted digital information to the satellite, on at least two different frequencies;
    at least, one satellite-borne module which receives, multiplexes and re-formats the information on only one downlink;
    at least one of the links which works in a Time Division Multiple Access (TDMA) mode;
    wherein the structure of MPEG2 packets of the signal transmitted via the satellite is used as follows for a definition of the TDMA frames, these TDMA frames being generated on board the satellite:
in lack of received data, the multiplexer generates jamming packets, the program identification (PID) of which takes a single value corresponding to each uplink;
when an going uplink is configured in TDMA mode, the multiplexer makes a numbering, in a cyclic manner, of the order of the generated packets, a 5-bit field for numbering the jamming packets, in the useful part of the MPEG2 packet, is used for this purpose;
when a burst in an going up station, among n stations, comes to the satellite in phase with a portion of TDMA frame, the DVB packets of this burst will be substituted to the jamming packets for this portion of TDMA frame.

2. The device as set forth in claim 1, wherein the signal that is transmitted via the satellite is a time multiplex signal containing all the useful information, individually transmitted toward the satellite by a plurality of earth stations and rigorously compatible with receivers designed for a reception of signals according to a standard of digital television broadcasting via satellite in the KU bands, called DVB-S.

3. The device as set forth in claim 1, wherein the activation or termination of the transmission of a TDMA station is made in an autonomous manner without coordination with the other stations sharing a same link.

4. The device as set forth in claim 1, wherein a short burst and predetermined packets are used for enabling the earth stations to make a fast, reliable and precise acquisition according to a protocols between them and a receiving part of the satellite-borne module.

5. The device as set froth in claim 1, wherein basic parameters, frame length, guard-time and synchronization protocols and the like, are chosen so to enable a simple implementation of the satellite-borne module.

6. The device as set forth in claim 1, wherein a frame structure transmitted via the satellite comprises a fixed number.

7. The device as set forth in claim 1, wherein adjunction of the TDMA mode is a modular adjunction, whereby only a few changes are made in the equipment of the earth transmission stations with respect to the continuous transmission mode.

8. The device as set forth in claim 1, wherein a compatibility of the multiplexed signal on the down link is made with earth receivers that are designed for receiving signals according to the DVB-S standard with adjunction of the TDMA mode.

9. A device for broadcasting digital information via satellite from a plurality of earth stations, comprising:
at least one set of links sending packet formatted digital information to the satellite, on at least two different frequencies;
at least, one satellite-borne module which receives, multiplexes and re-formats the information on only one downlink;
at least one of the links which works in a Time Division Multiple Access (TDMA) mode;
wherein a 52/48 ratio is used for the flow rate increase on the uplinks that are re-configured in TDMA mode.

10. A device for broadcasting digital information via satellite from a plurality of earth stations, comprising:
at least one set of links sending packet formatted digital information to the satellite, on at least two different frequencies;
at least, one satellite-borne module which receives, multiplexes and re-formats the information on only one downlink;
at least one of the links which works in a Time Division Multiple Access (TDMA) mode;
wherein a management of the TDMA mode is ensured by an indicator field, called PID field.

11. A device for broadcasting digital information via satellite from a plurality of earth stations, comprising:
at least one set of links sending packet formatted digital information to the satellite, on at least two different frequencies;
at least, one satellite-borne module which receives, multiplexes and re-formats the information on only one downlink;
at least one of the links which works in a Time Division Multiple Access (TDMA) mode;
wherein the PID field is used in a telemetry protocol.

12. The device as set forth in claim 11, wherein the signal that is transmitted via the satellite is a time multiplex signal containing all the useful information, individually transmitted toward the satellite by a plurality of earth stations and rigorously compatible with receivers designed for a reception of signals according to a standard of digital television broadcasting via satellite in the KU bands, called DVB-S.

13. The device as set forth in claim 11, wherein the activation or termination of the transmission of a TDMA station is made in an autonomous manner without coordination with the other stations sharing a same link.

14. The device as set forth in claim 11, wherein a short burst and predetermined packets are used for enabling the earth stations to make a fast, reliable and precise acquisition according ,to a protocols between them and a receiving part of the satellite-borne module.

15. The device as set froth in claim 11, wherein basic parameters, frame length, guard-time and synchronization protocols and the like, are chosen so to enable a simple implementation of the satellite-borne module.

16. The device as set forth in claim 11, wherein a frame structure transmitted via the satellite comprises a fixed number equal to 48 DVB packets.

17. The device as set forth in claim 11, wherein adjunction of the TDMA mode is a modular adjunction, whereby only a few changes are made in the equipment of the earth transmission stations with respect to the continuous transmission mode.

18. The device as set forth in claim 11, wherein a compatibility of the multiplexed signal on the down link is made with earth receivers that are designed for receiving signals according to the DVB-S standard with adjunction of the TDMA mode.

19. A device for broadcasting digital information via satellite from a plurality of earth stations, comprising:
at least one set of links sending packet formatted digital information to the satellite, on at least two different frequencies;
at least, one satellite-borne module which receives, multiplexes and re-formats the information on only one downlink;
at least one of the links which works in a Time Division Multiple Access (TDMA) mode;
wherein the PID field is used for synchronization management.

20. A device for broadcasting digital information via satellite from a plurality of earth stations, comprising:

at least one set of links sending packet formatted digital information to the satellite, on at least two different frequencies;

at least, one satellite-borne module which receives, multiplexes and re-formats the information on only one downlink;

wherein at least one of the links of a going up path (1a, 1b, . . . , 1n) of a transmission system of an earth station is configured in a Time Division Multiple Access (TDMA) transmission mode while at least one other link is configured in the continuous transmissions made.

21. The device as set forth in claim 9, wherein the TDMA or continuous configuration of an uplink is made without a working of the other links be affected thereby, by providing an increase of the transmission flow rate on the going up path of a link with respect to the continuous mode working on this link, and this increase is used for accommodating the preamble and guard-time functions of the transmission in a burst mode.

22. The device as set forth in claim 20, wherein the signal that is transmitted via the satellite is a time multiplex signal containing all the useful information, individually transmitted toward the satellite by a plurality of earth stations and rigorously compatible with receivers designed for a reception of signals according to a standard of digital television broadcasting via satellite in the KU bands, called DVB-S.

23. The device as set forth in claim 20, wherein the activation or termination of the transmission of a TDMA station is made in an autonomous manner without coordination with the other stations sharing a same link.

24. The device as set forth in claim 20, wherein a short burst and predetermined packets are used for enabling the earth stations to make a fast, reliable and precise acquisition according to a protocole between them and a receiving part of the satellite-borne module.

25. The device as set froth in claim 20, wherein basic parameters, frame length, guard-time and synchronization protocole and the Like, are chosen so to enable a simple implementation of the satellite-borne module.

26. The device as set forth in claim 20, wherein a frame structure transmitted via the satellite comprises a fixed number equal to 48 DVB packets.

27. The device as set forth in claim 20, wherein adjunction of the TDMA mode is a modular adjunction, whereby only a few changes are made in the equipment of the earth transmission stations with respect to the continuous transmission mode.

28. The device as set forth in claim 20, wherein a compatibility of the multiplexed signal on the down link is made with earth receivers that are designed for receiving signals according to the DVB-S standard with adjunction of the TDMA mode.

* * * * *